Dec. 23, 1952 DE FOREST ROE 2,622,745
APPARATUS FOR MOVING ARTICLES ON CASTER BEDS
Filed Dec. 17, 1948 2 SHEETS—SHEET 1
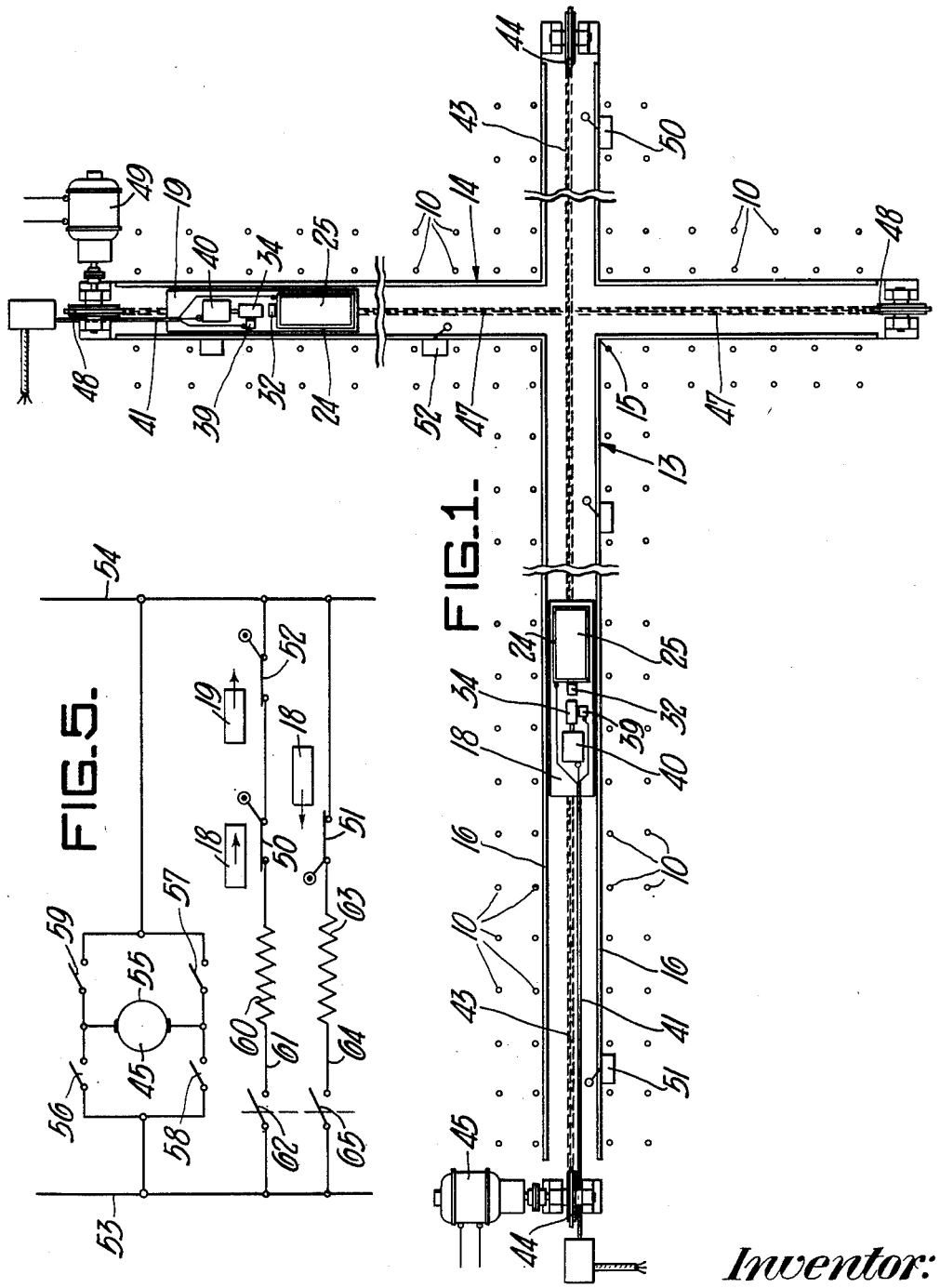
Inventor:
De FOREST ROE,
by: Donald G. Dalton
his Attorney.

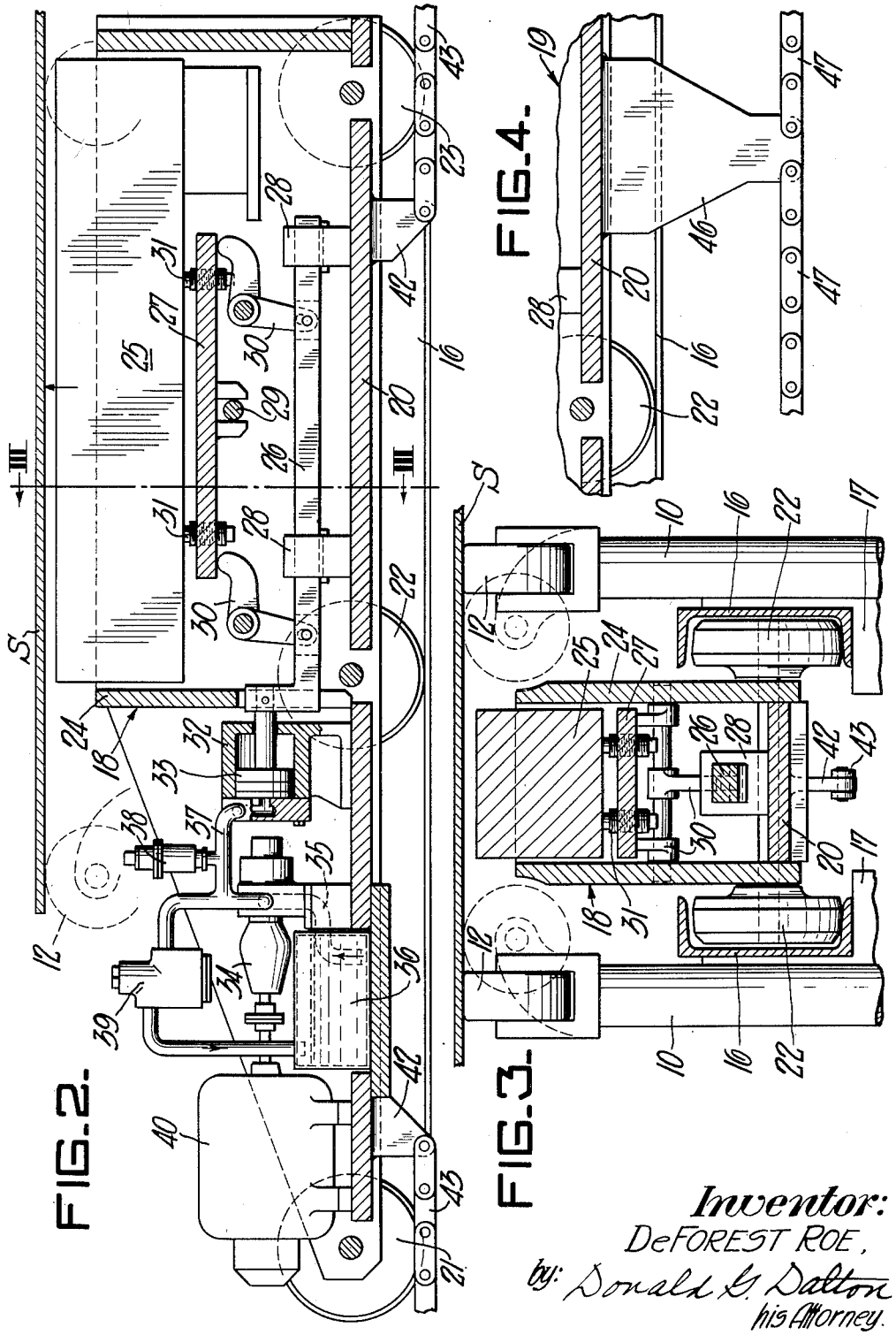

Patented Dec. 23, 1952

2,622,745

UNITED STATES PATENT OFFICE 2,622,745

APPARATUS FOR MOVING ARTICLES ON CASTER BEDS

De Forest Roe, Brentwood, Pa., assignor to United States Steel Company, a corporation of New Jersey Application December 17, 1948, Serial No. 65,788

3 Claims. (Cl. 214—1)

This invention relates to apparatus for moving articles on caster beds.

Caster beds comprise a large multiplicity of upright posts which have casters swivelled to their upper ends. Such beds commonly are used for handling heavy articles, such as steel plates preliminary to shearing. These articles are supported on the rotatable casters and hence are relatively easy to move. The usual practice has been to shove articles about manually to the desired location on the bed.

An object of the present invention is to provide improved apparatus for mechanically moving articles on caster beds, thereby eliminating manual operations.

A further object of the invention is to provide apparatus for mechanically moving articles on caster beds in which the mechanical means are carried on chain propelled carriages on different tracks which intersect, and said carriages are movable fully into the track intersections and thus cooperate for interchanging the articles from one carriage to the other.

A further object of the invention is to provide apparatus for mechanically moving articles on caster beds, which apparatus embodies carriages that are movably supported on tracks below the level of the casters and include electromagnets automatically lifted into contact with the article at the same time they are energized and released from contact when they are de-energized.

A further object of the invention is to provide apparatus for mechanically moving articles on caster beds in which the mechanical means are supported on tracks that intersect and have limit switches for preventing the carriages' over-running the tracks or colliding at intersections.

In accomplishing these and other objects of the invention, I have provided improved details of structure, a preferred form of which is shown in the accompanying drawings, in which:

Figure 1 is a top plan view of a caster bed equipped with an improved article moving apparatus embodying features of the present invention;

Figure 2 is a longitudinal sectional view of one of the magnet carriages;

Figure 3 is a cross sectional view of this carriage taken substantially on line III—III of Figure 2;

Figure 4 is a fragmental longitudinal sectional view of the other carriage; and

Figure 5 is a diagrammatic view of the electric circuit.

In the drawing there is shown a caster bed which comprises a large multiplicity of posts 10 and rotatable casters 12 swivelled to the top of each post in the usual fashion. These casters are adapted to carry heavy articles, such as steel plates S (Figure 2) to enable these articles to be moved readily, as known in the art.

In accordance with the present invention, a pair of intersecting tracks 13 and 14 are mounted within the caster bed (Figure 1). These tracks are horizontal and are situated at the same level, which is below the level of the bed. I have shown only two such tracks and these are perpendicular to each other and intersecting at 15. Nevertheless it is apparent that the track lay-out may vary as required by operating conditions, with the limitation that the various tracks should interconnect in order that articles may be interchanged from one to the other through the whole lay-out. Each track comprises a pair of opposed inwardly directed channels 16 (Figure 3) which are supported on uprights 17, or alternatively directly on posts 10 of the caster bed. The tracks are continuous except at intersection 15, where each is broken. Tracks 13 and 14 support carriages 18 and 19, respectively, which are similar, except for the chain attaching means hereinafter described.

Figures 2 and 3 show in detail the preferred carriage construction, carriage 18 being illustrated. This carriage comprises a chassis 20, which has three pairs of wheels 21, 22 and 23. Channels 16 receive these wheels and the clearance is sufficient to enable the wheels to run freely and yet to engage either the top or bottom flanges of the channels. When the carriage enters intersection 15, one pair of wheels crosses the break in the track and the other two pairs support the carriage, one of which may engage the top flanges of the channels. Chassis 20 has a fixed rectangular box 24 which contains an electromagnet 25 supported for vertical movement. When de-energized, the magnet preferably clears articles S by a half inch or so, and when energized preferably contacts the underface of these articles.

The preferred mechanism for supporting magnet 25 comprises a lower frame 26 and an upper frame 27. The lower frame is mounted for horizontal sliding movement in guides 28 upstanding from the carriage floor. The upper frame is mounted for vertical sliding movement on a cross bar 29 fixed to the side walls of the box. A pair of bell cranks 30 are pivoted to these side walls and have lower arms that are slidably and pivotally connected to the lower frame and upper arms that abut the underface of the upper frame for sustaining the weight of the latter and of the magnet. Upper frame 27 has set screws 31 on which magnet 25 rests and which are adjustable to insure proper clearance and contact of the magnet with the article. It is seen that shifting lower frame 26 to the right, as viewed in Figure 2, rotates bell cranks 30 counter-clockwise and lifts magnet 25 into contact with the underface of article S. Conversely shifting this frame to the left allows the bell cranks to rotate clockwise and the magnet to drop to its lower position.

The preferred mechanism for shifting the frame back and forth comprises a hydraulic cylinder 32 which is fixed to the chassis floor outside box 24 and which contains a reciprocable piston 33 connected to the lower frame 26. The hydraulic system for operating said piston includes a pump 34 which is of any standard construction and is connected via a pipe 35 to a supply of hydraulic fluid 36 and via a pipe 37 to cylinder 32. The piston is moved to the right whenever the pump forces fluid into the cylinder behind the piston. Pipe 37 contains a spring operated relief valve 38 of any standard construction through which fluid escapes back to the supply whenever the piston is moved fully to the right and the pump continues to operate. A normally open solenoid operated drain valve 39 of any standard construction is connected to pipe 37 and allows fluid to escape from the cylinder back to the supply when the pump is stopped. An electric motor 40 drives pump 34.

A flexible electric cable 41 is supported on the chassis and contains leads to magnet 25, to motor 40, and to drain valve 39 (Figure 1). These leads preferably are connected in parallel so that all three are energized simultaneously. Inasmuch as this circuit comprises only three parallel connections and an operating switch, it is deemed unnecessary to show it in detail. Thus the magnet is energized and creates a magnetic field that attracts the article and simultaneously the motor lifts the magnet into contact with the underface of the article and the solenoid valve closes to prevent escape of fluid from the cylinder, except via the relief valve. When the magnet is de-energized, the pump stops and the solenoid operated valve opens. Fluid then escapes from the cylinder through the latter valve and the magnet settles by its own weight to its lower position.

Carriage 18 has relatively short downwardly depending coupling lugs 42 adjacent each end (Figure 2). One end of a propulsion chain 43 is connected to each of said lugs. Said chain runs around sprockets 44 situated at the extremities of track 13 (Figure 1). One of these sprockets is driven by a reversible electric motor 45, the circuit of which is described more fully hereinafter.

Carriage 19 has a single, relatively long downwardly depending coupling lug 46 situated approximately mid-way the length of its magnet 25 (Figure 4). The ends of a propulsion chain 47 are both connected to this one lug. The chain runs around sprockets 48, which are situated at each end of track 14 and are offset below the axis of sprockets 44 (Figure 1). Thus the upper and lower runs of chain 43 in each instance are above the corresponding runs of chain 47. A reversible electric motor 49 drives one of the sprockets 48.

It is seen that carriage 18 can travel the full length of track 13 and can cross intersection 15 freely without interference from the lower chain 47, which propels carriage 19. Carriage 19 may travel into intersection 15 up to the point where lug 46 abuts upper chain 43, at which its magnet is fully within the intersection. Therefore the magnet on either carriage may draw an article fully into the intersection, and that carriage then can back away from the intersection. The other carriage then can move into the intersection to draw the article along the other track and thus the carriages cooperate for interchanging articles from the field of attraction of one to that of the other.

The preferred electric circuit for motor 45 is shown diagrammatically in Figure 5. In describing this circuit, I consider movement of carriage 18 toward the right, as viewed in Figure 1, as forward movement of this carriage and movement toward the left as reverse movement. The circuit includes normally closed forward and reverse limit switches 50 and 51 respectively which are situated at the ends of track 13 and are adapted to be opened by engagement with carriage 18 for preventing this carriage's overrunning the track. This circuit also includes a normally closed collision limit switch 52 situated near intersection 15 and adapted to be opened by engagement with carriage 19 for preventing carriage 18 from entering the intersection when carriage 19 is already there.

Referring to Figure 5, the circuit for motor 45 comprises conductors 53 and 54 connected to an outside power source. The motor armature 55 is connected across these conductors via forward magnetic contactors 56 and 57 and reverse magnetic contactors 58 and 59. When the forward contactors close, the motor propels carriage 18 to the right and, when the reverse contactors close, the motor propels carriage 18 to the left. A solenoid 60 for operating forward contactors 56 and 57 is connected across conductors 54 and 55 in a line 61 that also contains a master switch 62, forward limit switch 50 and collision limit switch 52. When either of these limit switches opens, the circuit cannot be completed through coil 60 and the forward contactors cannot close to propel carriage 18 to the right. A solenoid 63 for operating reverse contactors 58 and 59 is connected across conductors 53 and 54 in a line 64, which also contains a master switch 65 and reverse limit switch 51. When limit switch 51 opens, the circuit cannot be completed through coil 63 and the reverse contacts cannot close to operate the motor to drive carriage 18 to the left. Thus the motor can propel the carriage in either direction when master switch 62 or 65 closes, so long as all of the normally closed limit switches remain closed. Whenever conditions are such that the carriage should not move in one or the other direction, the appropriate limit switch opens and prevents the carriage's moving in that direction.

The circuit for motor 49 is similar and hence is not described in detail.

In operation, articles S are introduced to the caster bed over one of tracks 13 or 14 by any suitable delivery means. Carriages 18 or 19 on that track is propelled to a position beneath the article, with the magnet de-energized and in its lower position clearing the article. The magnet is energized to create a magnetic field and simultaneously rises into contact with the underface of the article. The motor 45 or 49 is started and propels the carriage along its track. The carriage draws the article into intersection 15 and then its magnet is de-energized and lowered and the carriage is backed away. The other carriage then is moved into the intersection and subsequently draws the article to the desired location in the caster bed.

From the foregoing description, it is seen that I have provided a complete mechanical means for moving articles about on caster beds, and one which eliminates the need for performing this operation manually. The offset arrangement of the propelling chains enables both carriages to be moved fully into the intersection for interchanging articles from one carriage to the other and the system of limit switches prevents over-running of either carriage or collisions between the two carriages.

In referring to certain elements as sprockets and chains, I do not wish to exclude various mechanical equivalents, such as sheaves and cables. Therefore, for purposes of the present specification and claims, I define the terms "sprocket" and "chain" as including their obvious equivalents.

While I have shown and described only a single embodiment of the invention it is apparent that modifications may arise. Therefore, I do not wish to be limited to the disclosure set forth but only by the scope of the appended claims.

I claim:

1. In combination with a caster bed, an apparatus for moving articles on said bed comprising a pair of intersecting tracks supported at the same level below the level of the bed, said tracks having upper and lower flanges which are continuous except at the track intersection, a carriage movably supported on each of said tracks and having three pairs of wheels riding between the flanges of its track, said carriages including magnets adapted to attract articles on said bed, and means for propelling said carriages and thereby moving articles in the direction of either of said tracks, each of said carriages being movable fully into the track intersection and being supported by two of its pairs of wheels while the third pair crosses the intersection, said carriages thus cooperating for interchanging articles from the field of attraction of the magnet on one carriage to that of the other.

2. In combination with a caster bed, an apparatus for moving articles on said bed comprising a pair of intersecting tracks supported at the same level below the level of the bed, said tracks having upper and lower flanges which are continuous except at the track intersection, a carriage movably supported on each of said tracks and having three pairs of wheels riding between the flanges of its track, said carriage including magnets adapted to attract articles on said bed, sprockets rotatably mounted at the ends of each of said tracks, the axes of rotation of the sprockets for one of said tracks being lower than those of the other, chains running over said sprockets and having their ends connected to said carriages at different levels, the lower chain being connected to its carriage intermediate the length of the carriage so that this carriage can move fully into the track intersection before its chain connection abuts the upper chain for interchanging articles with the other carriage, said carriages being supported by two of their pairs of wheels while the third pair crosses the intersection, and means for driving said sprockets and thereby moving articles on said bed in the direction of either of said tracks.

3. In combination with a caster bed, an apparatus for moving articles on said bed comprising a pair of intersecting tracks supported at the same level below the level of the bed, said tracks having upper and lower flanges which are continuous except at the track intersection, a carriage movably supported on each of said tracks and having three pairs of wheels riding between the flanges of its track, said carriages including magnets adapted to attract articles on said bed, sprockets rotatably mounted at the ends of each of said tracks, the axes of rotation of the sprockets for one of said tracks being lower than those of the other, chains running over said sprockets and having their ends connected to said carriages at different levels, the lower chain being connected to its carriage intermediate the length of the carriage so that this carriage can move fully into the track intersection before its chain abuts the upper chain, said carriages being supported by two of their pairs of wheels while the third pair crosses the intersection, electrically operated driving means for said sprockets for moving articles on said bed in the direction of either of said tracks, and limit switches in the circuits of said driving means adapted to be engaged by said carriages for preventing the carriages over-running the tracks and colliding at the intersection.

DE FOREST ROE.

REFERENCES CITED

The following references are of record in the file of this patent:

UNITED STATES PATENTS

| Number | Name | Date |
|---|---|---|
| 1,329,962 | Ennis | Feb. 3, 1920 |
| 1,340,595 | Biggert, Jr. | May 18, 1920 |
| 1,466,823 | Evans et al. | Sept. 4, 1923 |
| 1,737,762 | Howe | Dec. 3, 1929 |
| 2,301,892 | Lewis | Nov. 10, 1942 |
| 2,371,877 | Crosland | Mar. 20, 1945 |